United States Patent
Hallenstvedt et al.

[19]

[11] Patent Number: 5,992,599
[45] Date of Patent: *Nov. 30, 1999

[54] CONTROL SYSTEM FOR INTERMITTENTLY PULSING A VALVE CONTROLLING FORWARD AND REVERSE CLUTCHES A TRANSMISSION AND TRANSMISSION FITTED THEREWITH

[75] Inventors: Oddbjörn Hallenstvedt, Köping; Staffan Månsson, Myggenäs, both of Sweden

[73] Assignee: AB Volvo Penta, Chesapeake, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,085
[22] Filed: Dec. 30, 1996
[51] Int. Cl.$^6$ .............................. F16D 11/00; F16D 13/60
[52] U.S. Cl. ..................... 192/109 F; 192/51; 477/906
[58] Field of Search ...................................... 477/166, 169, 477/174, 906; 192/52.4, 109 F, 51

[56] References Cited

U.S. PATENT DOCUMENTS

| | | | |
|---|---|---|---|
| 3,823,801 | 7/1974 | Arnold . | |
| 4,040,508 | 8/1977 | Sunada et al. | 192/12 D |
| 4,414,863 | 11/1983 | Heino | 477/906 X |
| 4,667,787 | 5/1987 | Hofmann . | |
| 4,690,261 | 9/1987 | Peter et al. | 192/109 F |
| 4,709,792 | 12/1987 | Sakai et al. | 192/109 F |
| 4,747,796 | 5/1988 | Iwai et al. . | |
| 4,887,491 | 12/1989 | Holbrook et al. | 477/906 |
| 5,021,955 | 6/1991 | Ito et al. | 477/906 |
| 5,085,302 | 2/1992 | Kriesels | 192/51 |
| 5,163,542 | 11/1992 | Saiga | 192/109 F |
| 5,171,170 | 12/1992 | Ridder et al. . | |

FOREIGN PATENT DOCUMENTS 4347401  5/1995  Germany .

*Primary Examiner*—Khoi Q. Ta
*Attorney, Agent, or Firm*—Howrey & Simon; Michael J. Bell

[57] ABSTRACT

A control system for an engine transmission provided with a coupling mechanism for engaging or disengaging coupling of the transmission. The control system has one or more valves movable between two positions for controlling engagement and disengagement of the coupling mechanism. The valves are connected to an automatic control unit which has an intermittent signal supply trigger for supplying an intermittent pulsed signal to the valves, thereby providing an intermittent movement of the valves between the two positions.

28 Claims, 4 Drawing Sheets

5,992,599

CONTROL SYSTEM FOR INTERMITTENTLY PULSING A VALVE CONTROLLING FORWARD AND REVERSE CLUTCHES A TRANSMISSION AND TRANSMISSION FITTED THEREWITH

BACKGROUND OF THE INVENTION

1. Field of the Invention

The present invention relates to a control system for a transmission, and more particularly to a control system fitted to a transmission for marine application in which the output drive shaft is arranged to drive a propeller unit.

2. Description of Related Art

Marine propulsion systems are typically constructed with an engine driving a propeller by means of an intermediate transmission. The transmission may also include one or more coupling means in the form of a clutch that allows for the engagement and disengagement of the transmission with the propeller drive shaft. Such a transmission can be arranged to provide both forward and reverse operation of the propeller drive shaft.

In one arrangement, the engine-driven input shaft of the transmission is permanently connected, by a conical gear coupling, to a pair of opposed conical gears. Each of the gears is also rotatably supported on the transmission output drive shaft so that the opposed conical gears can rotate without being engaged with the transmission output shaft. In order to engage one of the opposed conical gears, each conical gear is arranged with its own fluid clutch. The clutches are engaged by supplying fluid pressure to them. Engagement of a clutch will thus cause either forward or reverse rotation of said transmission output shaft.

When driving a boat or other marine vessel, a problem occurs at low engine speed operation, e.g., at engine tickover speed (which typically lies between 500 to 900 r.p.m.), or at very low engine speed (typically up to about 1,200 r.p.m.). A significant amount of vibration often occurs at these speeds, both in forward and reverse drive modes. Additionally, the forward or reverse movement of the boat may be somewhat uneven.

The present invention reduces or overcomes the aforementioned vibrational problems by the provision of an appropriate control arrangement for the transmission system.

SUMMARY OF THE INVENTION

The present invention provides a control system for an engine transmission where the transmission is provided with a coupling mechanism for engaging and disengaging the transmission. The control system has at least one valve movable between first and second positions for controlling engagement and disengagement of the coupling mechanism of the transmission. An automatic control unit is connected to the valve, and includes an intermittent signal supply trigger for supplying an intermittent pulsed signal to the valve. The intermittent pulsed signal causes intermittent movement of the valve between its first and said second positions.

The invention further provides transmission for a boat engine. The transmission includes a power input, an output drive shaft, engageable to the input shaft; and a coupling mechanism for engaging and disengaging the input and output shafts. A control system is provided which includes first and second fluid valves in communication with the coupling mechanism. Each valve is movable between first and second positions for controlling engagement and disengagement of the coupling mechanism. An automatic control unit, connected to said first and second fluid valves, is also provided. The control unit includes an intermittent signal supply trigger for supplying an intermittent pulsed signal to the first and second fluid valves. This intermittent signal causes the valves to move intermittently between the first and second positions.

BRIEF DESCRIPTION OF THE DRAWINGS

The invention will now be described in more detail with reference to an embodiment thereof as depicted in the accompanying drawings, in which.

DETAILED DESCRIPTION OF THE PREFERRED EMBODIMENTS

The invention includes a control system having a valve that controls engagement and disengagement of the clutch of a transmission. As mentioned above, the valve has two positions. In one of the valve's positions, the valve supplies the clutch with pressure fluid, thereby actuating the clutch. In the other position, the valve cuts off fluid to the clutch, thereby de-actuating the clutch. The automatic control unit may be in communication with an engine throttle control unit and may receive input signals from the throttle control unit corresponding to the throttle position, for the purpose of varying pulse duration and the like.

The control system preferably utilizes at least one electrically operable fluid valve, and more preferably utilizes two valves, one for forward drive, and the other for reverse drive. In the case where two valves are utilized, the automatic control unit supplies the intermittent pulsed signal to only one of the valves at a given time.

The control system may preferably be provided with several safety features. First, the valves may be arranged so that when both of the valves are in their respective non-actuated positions (e.g., when there is a complete electrical failure), only one of the valves is in a position to supply fluid to its clutch. The system may more preferably be provided with a fault detector, an engine stopping mechanism, and/or a warning indicator. When the fault detector detects a fault has occurred in the one or more valves, a control circuit may light a warning light, or may activate an engine cutoff device to stop the engine from running during the fault.

Figure 1:
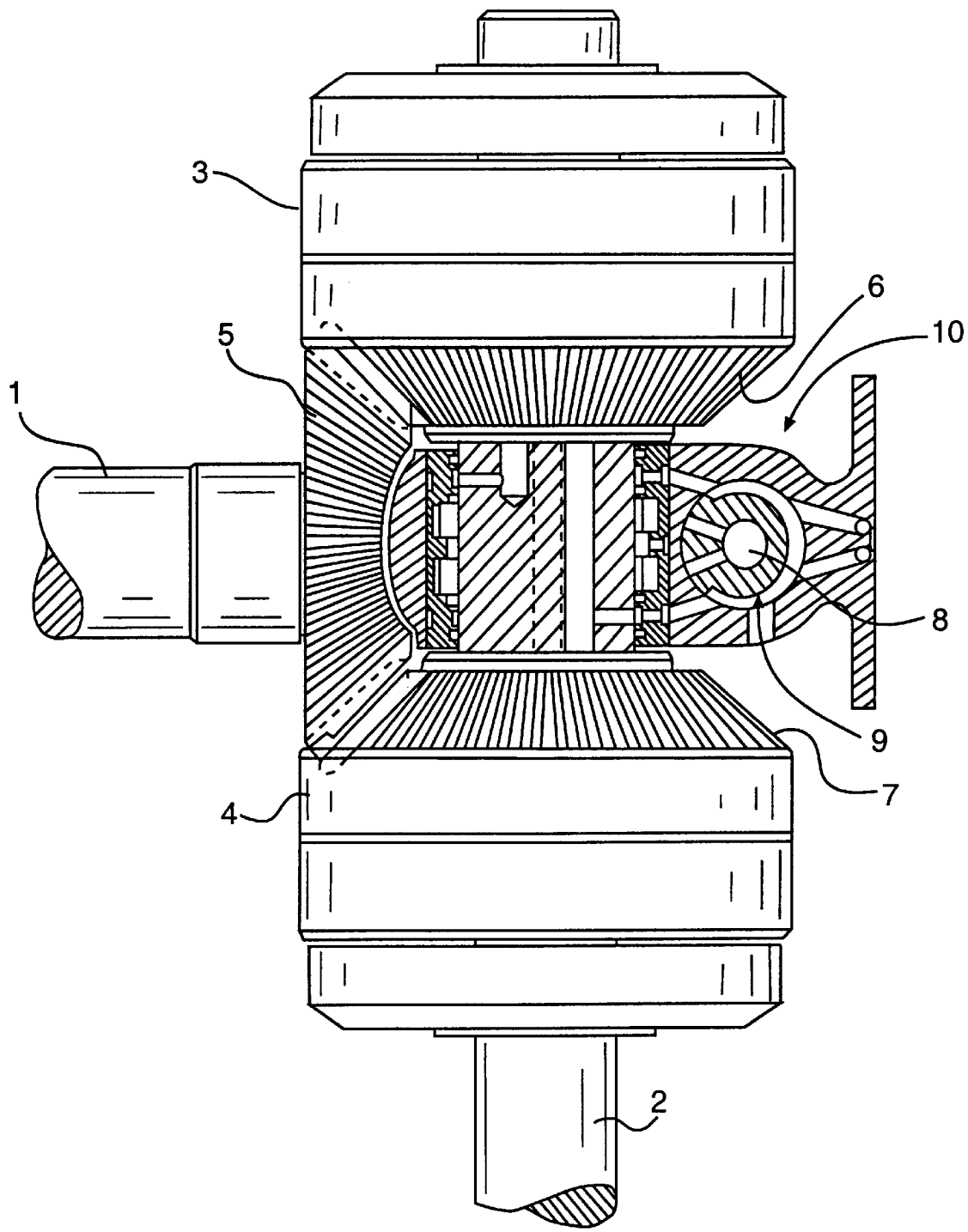
FIG. 1 shows a typical transmission to which the control arrangement of the invention can be applied.

The typical transmission device depicted in FIG. 1 will be used to help understanding of the type of operation to which the control system of the application is directed. The transmission device shown in FIG. 1 is one which is applied to a boat propeller drive and allows engagement of both forward and reverse drive. The transmission has an input shaft 1 driven by a power source of some type (not shown), and an output shaft 2 connected suitably to a propeller (not shown) or other propulsive means.

A first conical gear 5 is fixedly attached to the input drive shaft 1 and is in permanent engagement with a pair of opposed conical gears 6 and 7. As will be evident, rotation of gear 5 in one direction will cause gears 6 and 7 to rotate in opposite directions to one another around the output shaft 2. Conical gear 6, in this case, will provide drive to the propeller for moving the boat in a rearward direction and conical gear 7 will provide drive in the forward direction.

Each of the gears 6 and 7 is freely rotatably mounted with respect to the output shaft 2 until engaged therewith by means of a coupling device; the coupling device shown here consists of two multi-plate fluid clutches 3 and 4. Each of clutches 3 and 4 acts individually so as to cause engagement (or disengagement) of one of the conical gears 6 and 7 with the output shaft 2.

The engagement process is old in the art and thus will not be described in detail. However, in the example depicted, fluid from a pump (not shown) will enter through passageway 8 into rotational valve 9. Rotation of the valve 9 in a clockwise direction will cause fluid pressure to be supplied to the upper clutch 3, and rotation of the valve 9 in a counter-clockwise direction will cause fluid pressure to be supplied to the lower clutch 4. Fluid communication between the valve 9 and the clutches 3 and 4 is arranged such that only one clutch can be actuated at any one time. The valve and clutches communicate by means of internal passageways in the drive shaft 2 and surrounding bearing/fluid supply unit 10.

Figure 2:
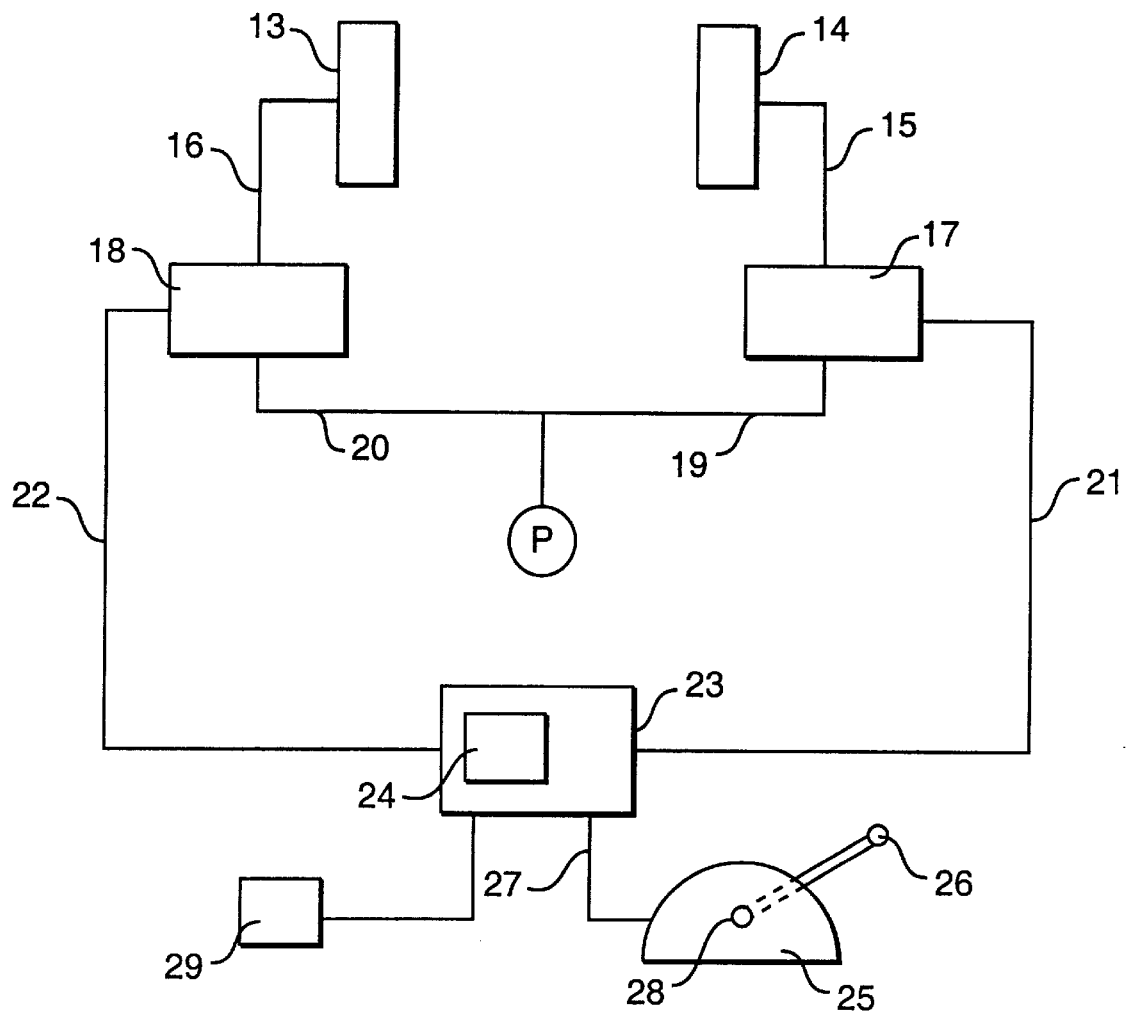
FIG. 2 shows schematically one embodiment of the control arrangement in accordance with the invention.

The schematic representation in FIG. 2 comprises two coupling devices 13 and 14 corresponding, for example, to clutches 3 and 4 in FIG. 1. Thus clutch 13 will cause the transmission to provide reverse drive and clutch 14 will produce forward drive. Clutch 13 receives an engagement or disengagement control input via line 16 from a valve 18, whilst clutch 14 receives such a control input via line 15 from a valve 17. In a preferred embodiment, the lines 15 and 16 may be hydraulic fluid lines which are supplied with pressurized fluid, by means of pump P through lines 19 and 20, when valves 17 and 18 are in a predetermined position. The upper part of the schematically represented circuit is thus a fluid control circuit.

Valves 17 and 18 are constructed to adopt each at least two positions (and normally only two positions), referred to hereinbelow as a first position and a second position. In one of the positions of valve 17, the clutch 14 will be disengaged, and in the other position the clutch 14 will be engaged. Valve 17 and 18 are constructed so that they may periodically alternate between the first and the second position within a short response time for a large number of cycles without failure. A preferred valve embodiment will be explained below.

An automatic control unit 23, is connected to valves 17 and 18 via lines 21 and 22 respectively. Said lines may be electrical, pneumatic, or hydraulic, but in the preferred embodiment they are electrical connections. However it should be understood that other type of connections are possible, such as light filament connections or even contactless connections requiring a transmitting unit for example. What is important is that communication between the various elements at the end of the various lines can be established.

Automatic control unit 23 comprises an intermittent signal trigger 24. Trigger 24 may be an integral part of the automatic control unit 23, such as by being part of its circuitry or it may be separated from the main body of the control unit. For example trigger 24 might be placed near each of the valves and be connected to the main body of the automatic control unit by means of an electrical conductor.

The trigger 24 has the purpose of supply an intermittent pulsed signal to one of valves 17 or 18, when the boat is intended to move forward or backwards slowly, i.e. at low engine speeds, typically between 500 and 900 r.p.m. but also up to about 1200 r.p.m. The intermittent signal will be sent to either valve 17 or valve 18 so as to displace it periodically between its respective first and second positions. In this way, one of the clutches will be intermittently engaged and disengaged.

Figure 3:
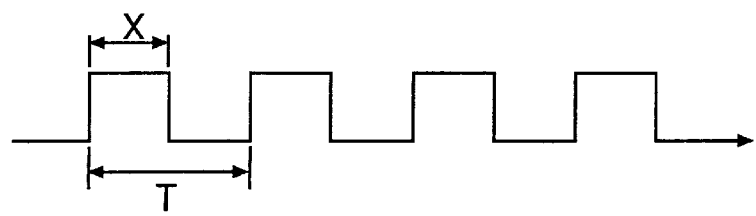
FIG. 3 shows an intermittent signal emitted by the intermittent signal supply trigger.

An example of the pulsed signal supplied by said trigger 24 is depicted in FIG. 3. Here, a square pulse of duration "x" is intermittently supplied from the trigger 24. The pulse duration may vary preferably has a duration of between 0.5 and 3.0 seconds. In the example shown, each of the pulses of the intermittent signal has the same duration "x". The length "T" indicates the periodic time of the pulse form the start of one pulse to the start of the next. Typically "T" will be about 3.0 seconds when the pulse duration is about 0.5 seconds.

During operation, it may be advantageous to vary the pulse duration "x" with respect to the engine speed. This could be accomplished, for example, by varying the pulse duration from a long pulse duration of about 3 seconds at engine speeds up to about 1,200 r.p.m., and gradually reducing the pulse duration down to about 0.5 seconds at engine tickover speed. The automatic control unit can be arranged to perform this function without manual intervention or adjustment. However, it may be desirable additionally, or alternatively, to have a manually operable means such as a potentiometer 29 which can be adjusted manually to modify the pulse duration and/or the periodic time. In such a way it allows use of the control system in boats having differing characteristics with regard to weight, length, engine harmonic rotational speeds, etc. This manual setting will enable the control system not only to be tuned to any of a number of boats or vessels, but also to be adjusted to compensate for modified conditions of the same boat (such as when the boat is carrying a heavy load, for example).

The magnitude of the intermittent pulse of the signal will be chosen in accordance with the requirements for operating the valve.

An engine throttle lever 26 is accurately movable around pivot 28 within a casing 25. Such a combination schematically represents a typical known arrangement. However, in accordance with the present invention, the control system is designed to operate in the "low to tickover" speed range of the engine. Thus, a control input is fed via line 27 to unit 23, indicating the throttle lever position. The control unit 23 will be preset with a predetermined engine speed, normally below 1,200 r.p.m., at which it is desired to couple in the intermittent signal supply trigger 24 of the control system.

The control system of the invention is not only applicable to transmissions having two clutches. It may be suitable, depending on the boat or vessel concerned, to have only a forward drive; in such a case, only one valve 17 for intermittent engagement and disengagement of forward drive would be required. Moreover, even where two clutches are present for forward and reverse drive, it may still be suitable to use the intermittent drive only on the forward drive clutch since the reverse drive is used relatively rarely. This would save cost of course.

Figure 4:
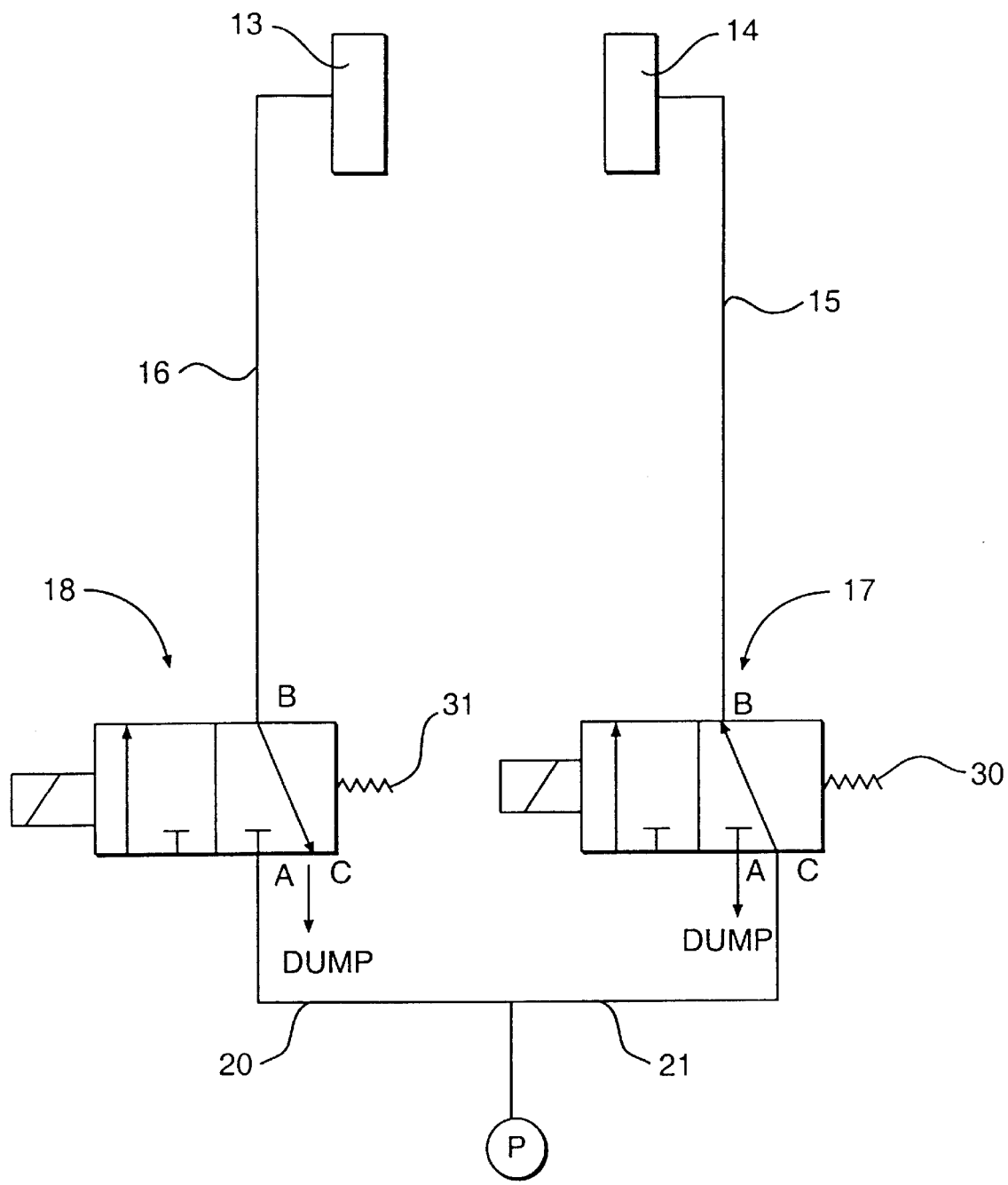
FIG. 4 shows a more detailed view of the electrically-operated fluid valve means of the fluid control system depicted in FIG. 2.

FIG. 4 depicts the valves 17 and 18 as applied to a hydraulic circuit. Each of the valves 17, 18 is a 3/2 valve (3-way, 2-position). The valves are suitably constructed as electrically-operated solenoid valves, whereby the intermittent signal supplied from the signal supply means will be an electrical signal.

Each valve 17, 18 is shown in its non-actuated position, whereby biasing means such as springs 30 and 31 force the valves to assume a position in which fluid from pump P is transferred via line 21 through valve inlet C to valve outlet B and via line 15 to cause engagement of forward drive clutch 14. At the same time, valve 18 is in a position which allows hydraulic fluid to flow to the DUMP (and to the reservoir) from connection B via connection C. In this way, only the forward drive clutch is engaged.

Thus, it will be appreciated that if electrical power should fail, the control system has a default setting such that hydraulic fluid will only be supplied to one valve (valve 17). This enables the engagement of forward drive only without the requirement of electrical power, and will thus allow the boat to be driven forwards by the engine as a "get-me-home" safety feature in the event of electrical failure.

In the position shown in FIG. 4, forward drive is engaged. Reverse drive can be engaged by moving valve 17 to the right and valve 18 to the right (the directions being taken as depicted in FIG. 4). Neutral drive is engaged by moving valve 17 to the right and leaving valve 18 as shown in FIG. 4.

The movement of the valves 17,18 from the unactuated position (FIG. 4) to the right constitutes a movement of the valve between first and second position (or between second and first positions) in accordance with this invention. As will be clear from comparing FIGS. 2 and 4, the control lines 21 and 22 are responsible for transmitting the signal which causes such movement. In a normal engine operating mode (e.g. mid-range engine speed), the intermittent signal supply trigger is deactivated such that a constant signal is supplied to either valve 17 or valve 18 to activate it into the required position. However, when it is desired to engage the intermittent drive at low speed, the constant signal is overridden by the intermittent pulsed signal instead.

Alternatively the control system can be fitted or retrofitted to an existing transmission, such as a transmission described in the prior art of FIG. 1, by arranging that the valves are able to intermittently block and allow passage of fluid in the supply line to a respective clutch. In this way, the main forward and reverse drive control would operate as normal, but the extra valves 17 and 18 added to the system would act on the fluid supply lines communicating from the already existing forward drive circuit. Such a retrofitted system could be arranged with the intermittently operated valves either in, or upstream of, the fluid supply control lines of the existing system. As a further alternative, the control means used in the transmission of FIG. 1 could be replaced by a control unit according to the present invention.

The actual control circuitry for producing the control system in accordance with any of the above embodiments will not be described in detail in this application, as such circuitry can be constructed in many conventional ways, using either hydraulic, electrical, or electronic control elements for example.

As explained above, the intermittent actuation of the forward (or rear) clutch at low speed will cause the propeller to be intermittently driven and then not driven. Thus, if the tickover speed of the engine is, for example, 600 r.p.m., the "effective" driven r.p.m. of the propeller can be reduced down to a much lower value (e.g. 200 r.p.m.) when the intermittent drive is engaged. The "effective" r.p.m. is the number of revolutions per minute taken over one complete periodic time period of the pulsed signal. This has the advantage that vibrations often do not have a chance to establish themselves at all due to the vibration source being removed intermittently. Consequently, the boat or vessel will feel more comfortable, which will be particularly noticeable when the boat is driven with the intermittent drive engaged for long periods of time. Additionally, the intermittent drive or "trolling" drive as it is known, can achieve a much smoother passage through the water despite it being intermittent in nature, this being due to the short pulse duration of approximately 0.5 to 3.0 seconds.

As will also be evident, the boat can achieve not only a smoother ride, but also a slower lowest speed due to the effective r.p.m. reduction. This will facilitate precise maneuvering of the boat in small spaces or tight passageways without constant engagement of forward and reverse drives to achieve a desired forward drift speed of the boat.

Figure 5:
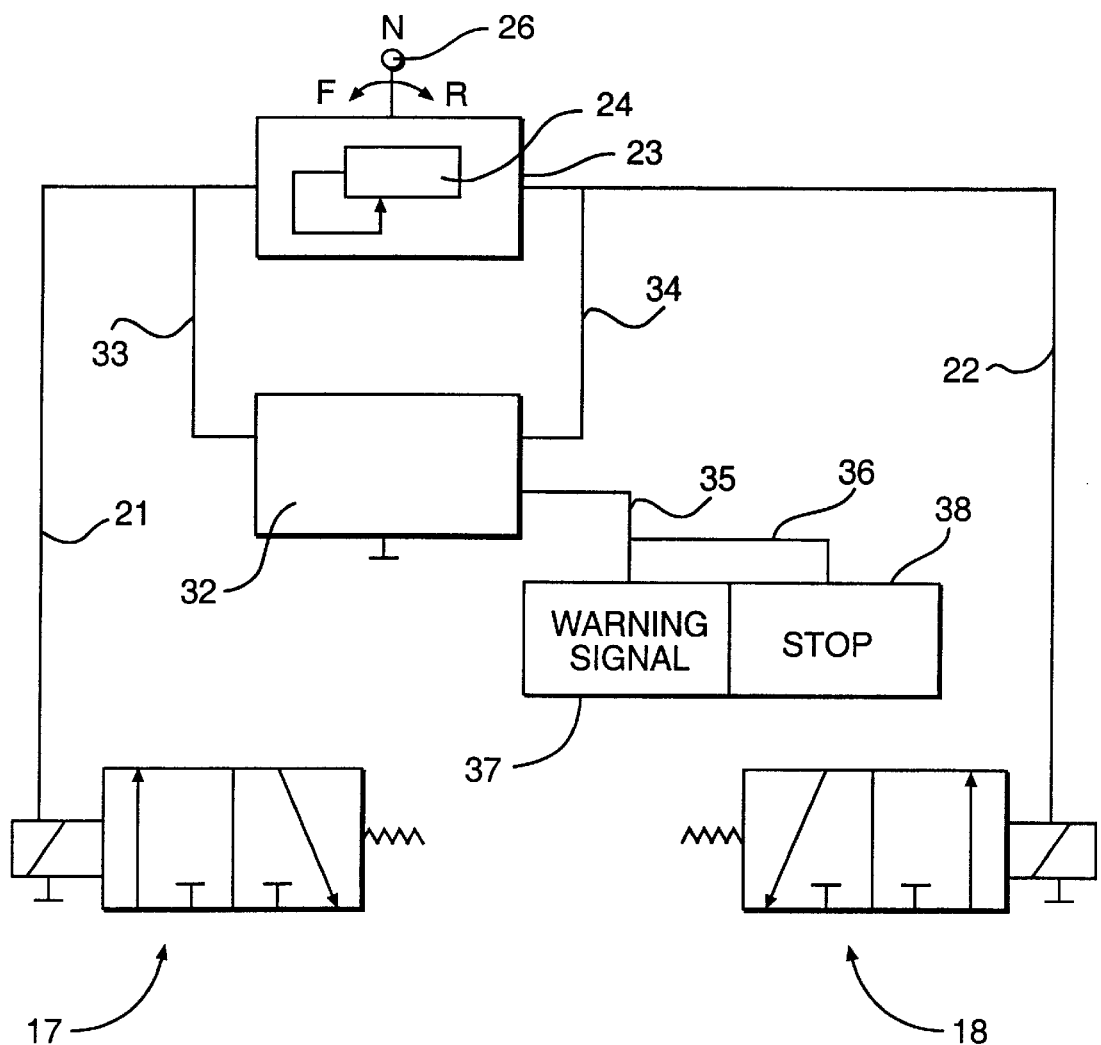
FIG. 5 shows a further development of the control system in which a monitoring circuit for the valves is included.

FIG. 5 shows a further development of an electrical control circuit, in which a monitoring and warning/stop system is included in the electrical part of the valve circuit. Elements which have already been described have been given the same reference numeral. It will be noticed that although valves 17 and 18 have been depicted in a different orientation to that in FIG. 4, the function of the valves is unchanged.

Monitoring unit 32 is provided, and may be a resistance monitor, for example. The resistance monitor 32 is connected via electrical connections 33 and 34 with the control lines 21 and 22, respectively, which lead to the valves 17 and 18. The purpose of the resistance monitor 32 is to check whether there has been a failure in either (or both) of the lines 21 and 22, or in the valves 17 and 18, which has led to the valves 17 or 18 being left inoperative or partially inoperative. This can be done by providing a check on the resistance for example. The purpose of such control will be explained further below.

Additionally, there is a warning signal unit 37 connected via line 35 to the monitoring unit 32. The warning signal unit 37 can issue a light or audible warning (or both) for example, so as to warn the boat driver that one (or both) of the valves 17 and/or 18 is inoperative. Also, line 36 (e.g., an electrical connection) may be included, communicating with stop device 38 which will stop the engine if a particular error condition occurs, as explained below. For a diesel engine configuration, the engine might be stopped, by sending a current to the fuel supply stop magnet so as to cut off the fuel supply. For a gasoline engine, the ignition would normally be cut when the engine is to be stopped.

The reason that such a control of the valve operation may be provided is that certain conditions can exist in which it would be undesirable for the safety default setting (i.e. the "get-me-home" setting) of the valves to start operating. For example, if the control level is in neutral (engine ticking over at a dock for example), forward or rearward movement could be hazardous. However, with the system previously described incorporating the safety default feature, if electrical power to the valves would fail for some reason, the valves would take up the safety default setting and provide fluid pressure to engage the forward drive clutch. As is evident, the extra control system of FIG. 5 would prevent this occurrence by sending a stop signal to the engine stop device 38. However the system could be provided with a safety-override function so that, if necessary, the engine can be restarted as a further failsafe measure to avoid the boat being totally stranded when neutral was engaged during a particular maneuver when the electrical power to the valves 17 or 18 fails.

Similarly, the warning signal device 37 will warn the driver if either of the valves developed a fault while the engine is being operated and the boat is being driven. For example, if the boat was being driven in reverse and the forward drive valve 18 failed, the driver would be made aware of this fact and would realize that his normal possibilities of boat maneuvering were more limited, since the "get-me-home" function would have to be engaged. The stop function would not need to be actuated in such a situation, and the system would preferably be set up to take this possibility into account.

The invention is not limited to the above description, and changes may be made without departing from the scope of the invention. For example, the automatic control unit may be a control unit which, during normal operation, does not require manual inputs in order for it to function as required. However, it should be understood that manual inputs (e.g., movement of a lever or the like), which can vary the settings of the automatic control unit for differing conditions, are not excluded.

We claim:

1. A control system for an engine transmission, the transmission being provided with a coupling mechanism for engaging or disengaging the transmission, said control system comprising:

at least one valve movable between first and second positions for controlling engagement and disengagement of the coupling mechanism; and an automatic control unit, connected to said at least one valve, said automatic control unit including an intermittent signal supply trigger for supplying an intermittent pulsed signal to said valve for effecting intermittent movement of said valve between the first and the second positions, movement of said valve between the first and second positions effecting engagement and disengagement of the coupling mechanism.

2. A control system according to claim 1, said at least one valve comprising at least one fluid valve in a fluid control circuit, and wherein movement of said at least one fluid valve between said first and said second positions respectively alternately enables one of the supply and the cutting off of flow of fluid to said coupling mechanism by said fluid valve.

3. A control system according to claim 2, further comprising an engine throttle control unit, by which a throttle position of the engine is adjusted, said automatic control unit being in communication with said engine throttle control unit and receiving input signals from said throttle control unit corresponding to the throttle position, and wherein said at least one fluid valve is an electrically operable valve.

4. A control system according to claim 1, said intermittent pulsed signal including pulses having a pulse duration in a range of approximately 0.5–3.0 seconds so as to correspondingly move said valve into said first position or said second position intermittently for a duration of substantially 0.5–3.0 seconds.

5. A control system according to claim 4, further comprising a pulse control mechanism, in communication with said intermittent signal supply trigger, for manually controlling said pulse duration.

6. A control system according to claim 5, said pulse control mechanism including a potentiometer.

7. A control system according to claim 4, said intermittent pulsed signal having a periodic time from the start of one pulse to the start of a next pulse of about 3.0 seconds.

8. A control system according to claim 2, said at least one fluid valve comprising a first valve and a second valve, said automatic control unit being arranged to supply an intermittent pulsed signal to only one of said first and second valves at a given time.

9. A control system according to claim 8, said first and second positions of said first and second valves corresponding respectively to an actuated and a non-actuated position for each of said valves, such that when both of said valves are in their respective non-actuated positions, only one of said first and second valves is in a position supplying fluid to said coupling mechanism.

10. A control system according to claim 3, further comprising a control circuit, disposed in parallel with said automatic control unit and in series with said at least one fluid valve, said circuit including an engine stopping mechanism and a fault detector, wherein when said fault detector determines that a fault has occurred in said at least one fluid valve, said control circuit activates said engine stopping mechanism to stop the engine.

11. A control system according to claim 3, further comprising a control circuit, disposed in parallel with said automatic control unit and in series with said at least one fluid valve, said circuit including a warning indicator and a fault detector, wherein when said fault detector determines that a fault has occurred in said at least one fluid valve, said control circuit activates said warning indicator to indicate that said fault has occurred.

12. A control system according to claim 11, said control circuit further comprising an engine stopping mechanism, wherein when said fault detector determines that a fault has occurred in said at least one fluid valve, said control circuit activates said engine stopping mechanism to stop the engine.

13. A control system according to claim 12, said fault detector including a resistance monitor for monitoring the resistance in at least a line electrically communicating said automatic control unit with said at least one valve.

14. A transmission of a boat engine, comprising:

a power input shaft;

an output drive shaft, said output shaft being engageable to said input shaft;

a coupling mechanism for engaging and disengaging said power input shaft and said output drive shaft;

a control system including first and second fluid valves in communication with said coupling mechanism and each respectively movable between first and second positions for controlling engagement and disengagement of said coupling mechanism, and an automatic control unit, connected to said first and second fluid valves, including an intermittent signal supply trigger for supplying an intermittent pulsed signal to one of said first and second fluid valves for effecting intermittent movement of said valves between said first and said second positions.

15. A transmission according to claim 14, said coupling mechanism comprising a forward-drive fluid-actuated clutch and a rearward-drive fluid-actuated clutch, each of said clutches being operated by a respective one of said first and said second fluid valves.

16. A transmission according to claim 14, further comprising an engine throttle control unit, by which a throttle position of the engine is adjusted, said automatic control unit being in communication with said engine throttle control unit for receiving input signals from said throttle control unit corresponding to the throttle position, wherein said intermittent signal supply trigger only begins to supply said intermittent signal when the throttle is in a predetermined throttle position.

17. A transmission according to claim 16, said predetermined throttle position corresponding to a motor speed of less than 1200 rpm.

18. A transmission according to claim 16, said predetermined throttle position corresponding substantially to engine idling speed.

19. A transmission according to claim 19, said intermittent pulsed signal including pulses having a pulse duration, and said intermittent signal supply trigger is arranged to vary said pulse duration according to the throttle position.

20. A control system for an engine transmission, the transmission being provided with a coupling mechanism for engaging or disengaging the transmission, said control system comprising:
   at least one valve movable between first and second positions for controlling engagement and disengagement of the coupling mechanism; and
   an automatic control unit, connected to said at least one valve, said automatic control unit including an intermittent signal supply trigger for supplying an intermittent pulsed signal to said valve for effecting intermittent movement of said valve between the first and the second positions;
   wherein the intermittent pulsed signal includes pulses having a pulse duration in a range of approximately 0.5–3.0 seconds so as to correspondingly move said value into the first position or the second position intermittently for a duration of substantially 0.5–3.0 seconds.

21. A control system according to claim 20, further comprising a pulse control mechanism, in communication with said intermittent signal supply trigger, for manually controlling said pulse duration.

22. A control system according to claim 21, said pulse control mechanism including a potentiometer.

23. A control system according to claim 20, the intermittent pulsed signal having a periodic time from the start of one pulse to the start of a next pulse of about 3.0 seconds.

24. A control system for an engine transmission, the transmission being provided with a coupling mechanism for engaging or disengaging the transmission, said control system comprising:
   at least one valve movable between first and second positions for controlling engagement and disengagement of the coupling mechanism, said at least one valve comprising at least one fluid valve in a fluid control circuit, and wherein movement of said at least one fluid valve between the first and the second positions, respectively, alternately enables on of the supply and the cutting off of flow of fluid to said coupling mechanism by the fluid valve;
   an automatic control unit connected to said at least one valve, said automatic control unit including an intermittent signal supply trigger for supplying an intermittent pulsed signal to said valve for effecting intermittent movement of said valve between the first and the second positions;
   said at least one fluid valve comprising a first valve and a second valve, said automatic control unit being arranged to supply an intermittent pulsed signal to only one of said first and said second valves at a given time.

25. A control system according to claim 24, the first and second positions of said first and second valves corresponding, respectively, to an actuated and a non-actuated position for each of said valves, such that when both of said valves are in their respective non-actuated positions, only one of said first and second valves is in a position supplying fluid to said coupling mechanism.

26. A control system for an engine transmission, the transmission being provided with a coupling, mechanism for engaging or disengaging the transmission, said control system comprising:
   at least one electrically operable valve, movable between first and second positions for controlling engagement and disengagement of the coupling mechanism, said at least one valve comprising at least one fluid valve in fluid control circuit, wherein movement of said at least one fluid valve between the first and the second positions, respectively, alternately enables one of the supply and the cutting off of flow of fluid to said coupling mechanism by said fluid valve;
   an automatic control unit, connected to said at least one valve, said automatic control unit including an intermittent signal supply trigger for supplying an intermittent pulsed signal to said valve for effecting intermittent movement of said valve between the first and the second positions;
   an engine throttle control unit, by which a throttle position of the engine is adjusted, said automatic control unit being in communication with said engine throttle control unit and receiving input signals from said throttle control unit corresponding to the throttle position; and
   further comprising a control circuit, disposed in parallel with said automatic control unit and in series with said at least one fluid valve, said circuit including an engine stopping mechanism and a fault detector, wherein when said fault detector determines that a fault has occurred in said at least one fluid valve, said control circuit activates said engine stopping mechanism to stop the engine.

27. A control system for an engine transmission, the transmission being provided with a coupling mechanism for engaging or disengaging the transmission, said control system comprising:
   at least one electrically operable valve movable between first and second positions for controlling engagement and disengagement of the coupling mechanism, said at least one valve comprising at least one fluid valve in a fluid control circuit, wherein movement of said at least one fluid valve between the first and the second positions, respectively, alternately enables one of the supply and the cutting off of flow of fluid to said coupling mechanism by said fluid valve;
   an automatic control unit, connected to said at least one valve, said automatic control unit including an intermittent signal supply trigger for supplying an intermittent pulsed signal to said valve for effecting intermittent movement of said valve between the first and the second positions;
   an engine throttle control unit, by which a throttle position of the engine is adjusted, said automatic control unit being in communication with said engine throttle control unit and receiving input signals from said throttle control unit corresponding to the throttle position; and
   a control circuit, disposed in parallel with said automatic control unit and in series with said at least one fluid valve, said circuit including a warning indicator and a fault detector, said control circuit further comprising an engine stopping mechanism;
   wherein when said fault detector determines that a fault has occurred in said at least one fluid valve, said control circuit activates said warning indicator to indicate that the fault has occurred and activates said engine stopping mechanism to stop the engine.

28. A control system according to claim 27, said fault detector including a resistance monitor for monitoring the resistance in at least a line electrically communicating said automatic control unit with said at least one valve.

* * * * *